(No Model.)

E. P. DONNELL.
ROLLER BOOK BACKING MACHINE.

No. 276,787. Patented May 1, 1883.

Attest
S. Björnsen
F. A. Staley

Inventor
Edward P. Donnell
By
H. Hanson
Attorney

UNITED STATES PATENT OFFICE.

EDWARD P. DONNELL, OF CHICAGO, ILLINOIS.

ROLLER BOOK-BACKING MACHINE.

SPECIFICATION forming part of Letters Patent No. 276,787, dated May 1, 1883.

Application filed May 15, 1882. (No model.)

*To all whom it may concern:*

Be it known that I, EDWARD P. DONNELL, a citizen of the United States of America, residing at Chicago, in the county of Cook and State of Illinois, have invented certain new and useful Improvements in Roller Book-Backing Machines, of which the following is a specification.

My invention relates to improvements in roller book-backing machines.

The objects of my invention are, first, to provide a means for quickly and accurately adjusting the roller for any sized book; second, to provide a spring of peculiar construction for relieving the machine of the jar occasioned by running the roller clear back. I attain these objects by the construction and arrangement of parts hereinafter fully described with reference to the accompanying drawings, in which—

Figure 2:
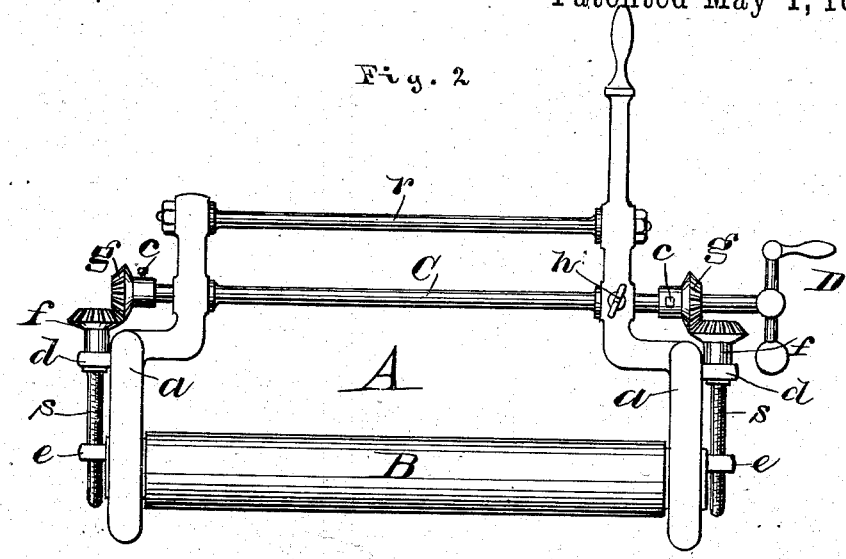
Figure 1:
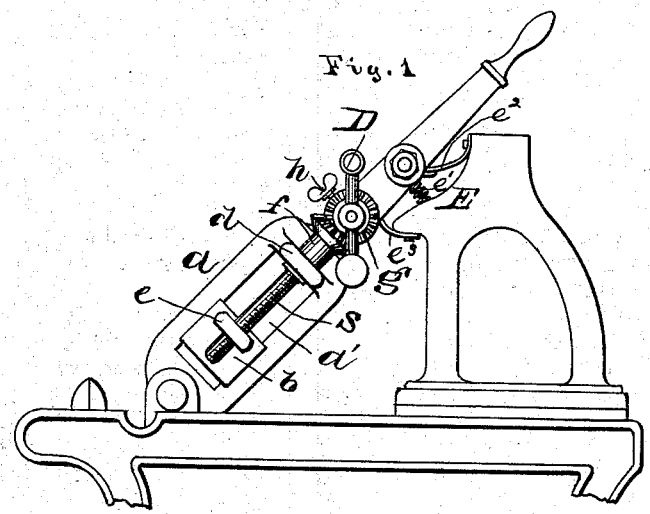

Figure 1 is a side elevation of upper portion of a roller-backing machine to which my improvements have been applied. Fig. 2 is a front view of the roller-frame, and Fig. 3 a detailed view of the spring arrangement.

Similar letters refer to similar parts throughout the several views.

In the said drawings, A represents the roller-frame, composed of the side pieces, $a\ a$, connected at the top by the rod $r$, and at the bottom to the other portions of the machine in the ordinary manner.

B is the roller, journaled at each end in the bearings $b\ b$, which slide in the ways $a'$ in the pieces $a\ a$, and are provided with lugs $e\ e$, tapped out to secure the ends of the screws $s\ s$, which are journaled in bearings $d\ d$, and provided at the top with beveled gear $f\ f$, which meshes with the bevel-gear $g\ g$ at each end of a shaft, C, which turns in bearings in the roller-frame A, and is provided at one end with a handle, D. The gears $g\ g$ are secured to the shaft C by means of set-screws $c\ c$. A set-screw, $h$, in one of the bearings of the shaft C serves to hold the shaft C from turning when desired.

To adjust the roller B, loosen the set-screw $h$ and turn the handle D on the end of the shaft C, which, through the agency of the gears $f$ and $g$, turns the screws S and moves the roller B to any position, keeping the ends of the roller at all times even.

If at any time it is desired to adjust the roller B at an angle, one of the set-screws $c$ is loosened and the opposite end of the roller turned up to the desired angle, when the set-screw $c$ is tightened and the roller operated as before.

Figure 3:
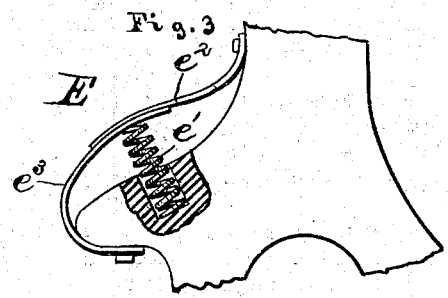

E represents my improved spring, which consists of the coiled spring $e'$, which presses against the two leaf-springs $e^2$ and $e^3$ in the manner shown in Fig. 3. When the roller is turned clear back the rod $r$ strikes on the spring E and relieves the machine of any jar. The spring E is very elastic and strong, and in working the machine rapidly assists in starting the frame A forward without any jar.

Having thus described my invention, what I claim as new, and desire to secure by Letters Patent, is—

1. The spring E, composed of the leaf-springs $e^2$ and $e^3$, in combination with the coiled spring $e'$, substantially as described and shown, and for the purpose set forth.

2. The combination, with the frame A, having an adjustable roller, B, of the spring E, composed of the coiled spring $e'$ and leaf-springs $e^2\ e^3$, substantially as shown and described.

In testimony whereof I affix my signature in presence of two witnesses.

EDWARD P. DONNELL.

Witnesses:
FRANK JOHNSON,
CHAS. KRESSMAN.